United States Patent [19]

Arnold

[11] 4,270,398
[45] Jun. 2, 1981

[54] MECHANICAL AMPLIFIER

[76] Inventor: Franz Arnold, Spatzenweg 20, D-8960 Kempten, Fed. Rep. of Germany

[21] Appl. No.: 81,701

[22] Filed: Oct. 3, 1979

[30] Foreign Application Priority Data

Oct. 11, 1978 [DE] Fed. Rep. of Germany ... 7830221[U]

[51] Int. Cl.³ .................. B25B 1/14; F16H 21/44
[52] U.S. Cl. ........................................ 74/110; 269/32
[58] Field of Search ............... 74/110; 269/32, 27, 269/20; 254/93 R

[56] References Cited

U.S. PATENT DOCUMENTS

| | | | |
|---|---|---|---|
| 2,335,743 | 11/1943 | Cross | 269/32 |
| 2,443,775 | 6/1948 | Olson | 269/32 |
| 3,941,362 | 3/1976 | Arnold et al. | 269/32 |
| 4,073,197 | 2/1978 | Arnold et al. | 74/110 |

Primary Examiner—Robert C. Watson
Attorney, Agent, or Firm—Blanchard, Flynn, Thiel, Boutell & Tanis

[57] ABSTRACT

The mechanical amplifier has a wedge-shaped primary member. The primary member is displaceable between two pairs of rollers which are arranged in mirrorimage with respect to a plane of symmetry. All rollers are arranged with their axes parallel, are freely movable, and lie against the wedge-shaped primary member. Two rollers which lie against each other are provided on each side of the wedge member, of which rollers one bears against a stationary abutment surface and the other bears against a co-operating bearing surface of a secondary member. At least one of said bearing surfaces includes with the plane of symmetry an angle of inclination which is less than 90°. A spring assembly which acts on the secondary member causes the rollers and their bearing surfaces to be held in continuous engagement against each other. The angle of inclination and the taper angle are so selected that, in all operating positions of the amplifier, the axes of two rollers which are in contact with each other always lie on the side, which is towards the plane of symmetry, of the connecting line connecting the contact lines between said rollers and their bearing surfaces.

13 Claims, 5 Drawing Figures

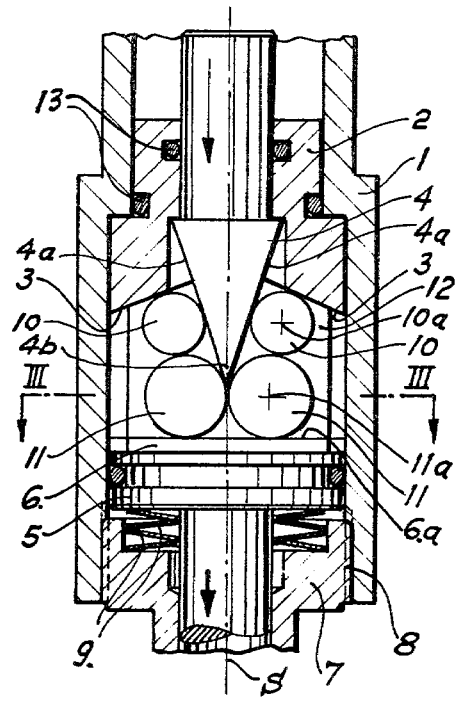
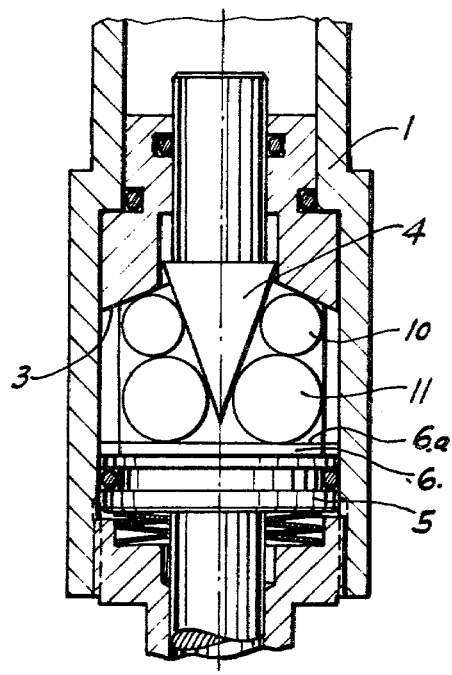
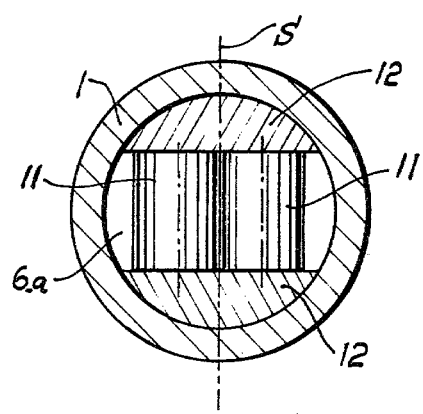

MECHANICAL AMPLIFIER

FIELD OF THE INVENTION

The invention relates to a mechanical amplifier comprising a wedge-shaped primary member which is displaceable between a first pair of two rollers which are arranged in mirror-image relation with respect to a plane of symmetry, along said plane of symmetry, and a secondary member which is displaceable in the same direction.

BACKGROUND OF THE INVENTION

A known amplifier of this kind has two angle levers which are arranged in mirror-image relation with respect to the plane of symmetry. The angle levers are each mounted pivotally in a housing about a respective axis and at the end of each of their lever arms they each carry a respective roller which is rotatable about an axis on the lever (see U.S. Pat. No. 2,443,775). The wedge configuration of the primary member acts on the rollers which are arranged on the longer lever arms of the angle levers, and thus pivots each lever about its mounting axis. The second roller which is provided on the shorter lever arm presses against a pin which is mounted displaceably in the housing and which forms the secondary member. The two secondary members act on the movable clamping jaw of a screw vice. This known mechanical amplifier is expensive to produce, as it consists of a large number of individual components. The axis members about which the rollers are mounted rotatably and also the mounting axis members for the angle levers are subjected to considerable forces and therefore also suffer from severe wear. As they can be subjected to only a limited loading, this known mechanical amplifier is either of large size or it can be used only to produce relatively low clamping forces. The assembly costs are also comparatively high because of the large number of individual components.

The invention is based on the problem of providing a mechanical amplifier of the above-indicated kind, which is simpler in construction, which has a smaller number of individual components, which is cheaper to produce, which is of small size and which operates with a low rate of wear.

SUMMARY OF THE INVENTION

According to the invention, this is achieved in that each of the freely movable rollers of the first pair of rollers bears on the one hand against a stationary abutment surface and on the other hand on a freely movable roller, which is arranged with its axis parallel, of a second pair of rollers which is arranged in a displaced position relative to the first pair of rollers, in the direction of the tip of the wedge shape, that the rollers of the second pair bear against cooperating bearing surfaces of the secondary member, that at least the bearing surfaces of one pair of rollers include with the plane of symmetry an angle of inclination which is smaller than 90°, that centering surfaces which are arranged in mirror-image relation with respect to the plane of symmetry are provided between the rollers of the second pair of rollers for the purposes of centering the rollers of the second pair in the starting position, and that the rollers which are in contact with each other and their bearing surfaces are held in continuous engagement by a spring assembly which acts on the secondary member, wherein the roller diameters, the angles of inclination of the bearing surface and the taper angle of the primary member are so selected that, in all operating positions of the amplifier, the axes of two rollers which are in contact with each other always lie on the side, which is towards the plane of symmetry, of the connecting line between the contact lines of said rollers with their bearing surfaces.

In the novel mechanical amplifier, there are no mounting axis members at all for the rollers, and there are also no angle levers or the like. The other few components of the amplifier are simple and cheap to produce. The flat bearing surfaces of the abutment means and the co-operating bearing means can be very easily produced by milling and grinding, as can the surfaces of the wedge configuration of the primary member. Commercially available cylindrical rollers as are fitted in roller bearings in large numbers can be used for the heavily loaded rollers. As these roller bearing rollers are produced in extremely high numbers, they can also be obtained at low cost. The assembly costs of the novel mechanical amplifier are also very low as the rollers simply lie loosely one upon the other or upon their bearing surfaces and can be easily fitted into a housing which encloses the amplifier, without a great deal of time and expense for assembly. As all components which are in contact with each other roll against each other substantially without slip and with line contact during the power amplifying stroke, friction and thus also wear are reduced to a minimum. In addition, in the novel amplifier, the transmission ratio can be easily altered by changing the angle of inclination of the abutment surface and/or the taper angle of the primary member. The centering surfaces which are arranged in mirror-image relation with respect to the plane of symmetry, between the rollers of the second pair of rollers, are also important to provide the novel amplifier with a more reliable mode of operation as these centering surfaces cause the rollers to be centered again in their initial or starting position.

A particularly advantageous embodiment of the amplifier according to the invention provides that the taper surfaces of the primary member extend as far as the second pair of rollers and also form the centering surfaces for the rollers of said second pair. This embodiment provides on the one hand a particularly simple structure and on the other hand also provides for a particularly high degree of operating reliability for the rollers of both pair of rollers can be in continuous engagement against the wedge primary member and therefore are centered and held in their proper position, not only in the initial position but also in any operating position of the amplifier.

So that the novel amplifier can be as small as possible in size, it is advantageous for the rollers of the first pair of rollers to be of smaller diameter than the rollers of the second pair. This arrangement provides in fact that the outer generating lines of the rollers of both pairs of rollers are at approximately the same distance from the common plane of symmetry, thereby providing for optimum utilisation of space.

A further advantageous embodiment provides that the roller diameters, the angles of inclination of the bearing surfaces with respect to the plane of symmetry and the taper angle of the primary member are so selected that the angles between the abutment surface and a tangential plane which passes through the contact line of the rollers which are in contact with each other and between the tangential plane and the co-operating bearing surface is larger than the angle of friction. This arrangement provides that, in any operating position, the rollers of both pairs of rollers are pressed towards the common wedge configuration of the primary member, by the abutment surface and the co-operating bearing surface, and are thus in continuous engagement against the wedge member. This means that the rollers are held in their proper position by means of the wedge member, in any operating position of the amplifier. The angle of friction ρ is a function of the coefficient of friction of the friction number μ, and indeed μ = tan ρ.

Further advantageous embodiments of the novel amplifier are characterised in the other subsidiary claims.

BRIEF DESCRIPTION OF THE DRAWINGS

The invention is described in greater detail hereinafter with reference to embodiments which are illustrated in the drawings, in which:

FIG. 1 shows a view in longitudinal section through a first embodiment of the amplifier, in the initial position, FIG. 2 shows a view in longitudinal section of the amplifier of FIG. 1 in the stressed condition, FIG. 3 shows a view in a section taken along line III—III in FIG. 1.

DETAILED DESCRIPTION

Figure 4:
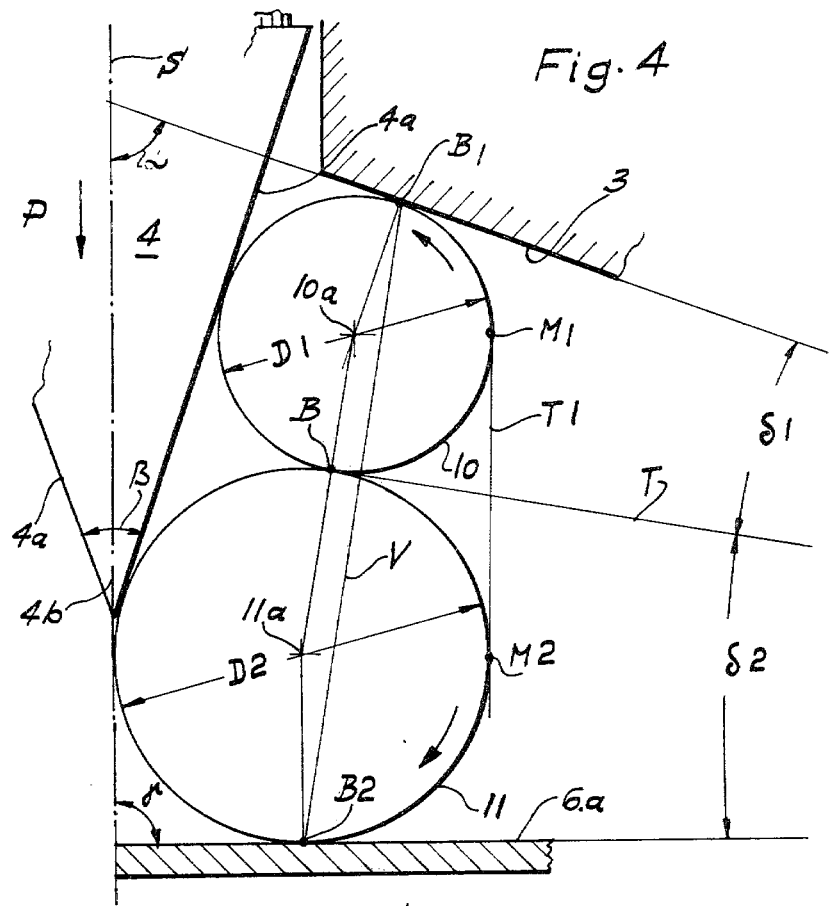
FIG. 4 shows details of the amplifier of FIG. 1, on an enlarged scale.

Referring to the drawings, FIGS. 1 to 3 show a first embodiment of the amplifier in approximately its natural size. Arranged stationarily in a housing 1 is an abutment member 2 which has flat abutment surfaces 3 which are inclined relative to each other in a wedge-like configuration. A wedge-shaped primary member 4 is mounted in the abutment member 2 and is displaceable along the plane of symmetry S. The primary member 4 has two flat tapered surfaces 4a which are inclined relative to each other at a taper angle β (FIG. 4). A secondary member 5 is also mounted in the housing 1, opposite the abutment surfaces 3, and is also displaceable in the direction of the plane of symmetry S. At its side which is towards the abutment surface 3, the secondary member has a pressure plate 6 of hardened steel with a co-operating bearing surface 6a. An end member 7 is provided at the end of the housing 1 and is fixedly connected to the housing by way of a screwthread 8. A plurality of plate springs 9 are arranged between the end member 7 and the secondary member 5, to apply to the secondary member 5 a pressure which is directed towards the abutment member 2.

The two rollers 10 of a first pair of rollers, which are arranged in mirror-image relationship with respect to the plane of symmetry S lie against the abutment surfaces 3. The rollers 10 simultaneously lie against the taper surfaces 4a. The rollers 10 are freely movable, that is to say, the axes 10a thereof are not mounted in any other component. The same also applies with regard to the axes 11a of the rollers 11 of a second pair of rollers 11, which is arranged at a displaced position, relative to the first pair of rollers, towards the tip 4b of the wedge member. The rollers 10 and 11 of both pairs bear against each other and the rollers 11 of the second pair lie against the co-operating bearing surface 6a. The rollers 10 and 11 are so-called cylindrical rollers as are used in roller bearings, and comprise hardened steel. The abutment surface 3 is also ground and hardened. As can also be seen from FIG. 3, the end faces of the rollers 10 and 11 lie against segment-shaped insert members 12 and are guided thereby. The space enclosed by the abutment surfaces 3, the co-operating bearing surfaces 6a and the housing 1 is almost completely filled with oil. Sealing rings 13 are provided to prevent the oil from escaping.

So that the novel amplifier operates satisfactorily, certain geometrical conditions must be fulfilled, which will now be described in greater detail with reference to FIG. 4. As can be seen from FIG. 4, the abutment surface 3 is inclined at an angle α relative to the plane of symmetry S. In the advantageous embodiment shown in FIGS. 1 to 4, the angle α is about 70°. The co-operating bearing surface 6a includes, with the plane of symmetry S, an angle γ which in this embodiment is 90°. The two taper surfaces 4a of the primary member include an angle β of 39°. The contact line at which the roller 10 of the first pair of rollers is in contact with the abutment surface 3 is denoted by B1. The roller 11 of the second pair is in contact with the co-operating bearing surface 6a at the contact line B2. Both rollers 10 and 11 are in contact with each other at contact line B. The important factor now is that the roller diameters D1 and D2, the angles of inclination α and γ of the bearing surfaces 3, 6a and the taper angle β of the primary member 4 are so selected that, in all operating positions of the amplifier, the axes 10a, 11a of two rollers 10 and 11 which are in contact with each other always lie on the side, which is towards the plane of symmetry S, of the connecting line V between the contact lines B1 and B2 between said rollers and their bearing surfaces 3, 6a.

In this way, a force component which is directed towards the plane of symmetry S and which holds at least the rollers of one pair of rollers in engagement against the taper surfaces 4a of the primary member always acts on the two rollers 10 and 11 in all operating positions. This engagement between the rollers and the taper surfaces 4a is also ensured, in the initial position shown in FIG. 1, by the force of the plate springs 9.

In the advantageous embodiment shown in FIGS. 1 to 4, the taper surfaces 4a of the primary member 4 extend to the rollers 11 of the second pair of rollers. The taper surfaces 4a thus also form centering surfaces for the rollers 11 of the second pair. Precise centering of the rollers 10 and 11 of both pairs is of great importance from the point of view of function of the amplifier.

When the primary member 4 is moved downwardly in direction P, its taper surfaces 4a apply an outwardly directed pressure to the rollers 10 of the first pair of rollers. The rollers are urged outwardly and in this movement roll against the abutment surfaces 3. By virtue of the rolling motion of the rollers 10, the rollers 11 of the second pair of rollers are also entrained and in turn roll against the co-operating bearing surfaces 6a. If now lubrication and friction were omitted, the rollers 11 of the second pair of rollers would move somewhat away in their movement outwardly from the taper surfaces 4a, as they move on the co-operating bearing surfaces 6a which are arranged normal to the plane of symmetry, while the abutment surfaces 3 form an acute angle to the plane of symmetry S. If the wedge member is moved in the opposite direction to the direction indicated by arrow P, the rollers 10 and 11 would also move back in the opposite direction into their starting position.

Due to different frictional conditions, vibration and the like however, a certain amount of slip may occur between the rollers 10 and 11, which slip may be different at the rollers on both sides of the plane of symmetry S. The two rollers 11 of the lower pair of rollers can thus move away by different distances from the plane of symmetry S. These perhaps slight differences in movement could add up, in the event of a number of changes in loading. For this reason, it is important that the rollers 11 of the second pair of rollers are always re-centered, at least in their starting position, by bearing against centering surfaces, in this case, by means of the taper surfaces 4a. The rollers 10 of the first pair of rollers are in any case always centered by bearing continuously against the taper surfaces 4a. In order to provide for centering of the rollers 11 of the lower pair of rollers, not only in the initial position of the amplifier but also in all operating positions, the measures described hereinafter are advantageously employed.

The roller diameters D1 and D2, the angles of inclination $\alpha$ and $\gamma$ of the bearing surfaces 3, 6a with respect to the plane of symmetry S and the taper angle $\beta$ of the primary member 4 are so selected that the angle $\delta$ 1 between the abutment surface 3 and a tangential plane which passes through the contact line B between the rollers 10 and 11 which are in contact with each other, is larger than the angle of friction $\rho$. Likewise, the angle $\delta$ 2 between the tangential plane T and the co-operating bearing surface 6a is larger than the angle of friction $\rho$. If the angles $\delta$ 1 and $\delta$ 2 are larger than the angle of friction, then both rollers 10 and 11 are always pressed towards the taper surfaces 4a and are held thereagainst in all operating positions of the amplifier. In this case, a certain degree of slip occurs between the rollers 10 and 11. However, the degree of such slip is comparatively low so that there is no noticeable water to be observed, as has been shown by experience. This is to be attributed to the fact that the rollers 10 and 11, as they are normally used as bearing rollers, are very finely ground and polished and also have a high degree of surface hardness. A sliding movement occurs between the taper surfaces 4a and the lower rollers 11, as the surfaces move in opposite directions with respect to each other. Here also there is no noticeable wear to be found, as the force components which are directed towards the plane of symmetry are relatively low. In general, it was found that the wear phenomena are negligibly small and in contrast, quite considerable advantages are achieved if the rollers 10 and 11 of both pairs of rollers are held in constant contact against the taper surfaces 4a in all operating positions of the amplifier, by the measures described above. In fact, in that case the rollers of both pairs of rollers are subjected to a uniform loading, and the arrangement provides that the rollers always return to their initial position, and do not jam, or one of the rollers is not pressed outwardly in an uncontrolled manner. So that this is ensured, the angles $\delta$ 1 and $\delta$ 2 should not under any circumstances be less than 3°.

It is also advantageous for the roller diameters D1 to be selected, in dependence on the taper angle $\beta$ of the primary member 4, that, in the initial position of the amplifier, the outermost generating lines M1 and M2 of two rollers 10 and 11 which are in contact with each other lie approximately on a common tangential plane T1 which extends parallel to the plane of symmetry S. This arrangement provides that the outermost generating lines M1 and M2 are at the same distance from the plane of symmetry, in all operating positions. This arrangement provides that the structural dimensions of the amplifier are minimised to the optimum degree. In the particularly advantageous embodiment of FIG. 1, the taper angle is about 39°. The diameter D1 of the smaller rollers 10 is 10 mm while the diameter D2 of the larger rollers 11 is 14 mm.

It has also been found advantageous for the acute angle $\alpha$ formed between the abutment surface 3 and the plane of symmetry and half of the taper angle $\alpha$ to add up to about 90°. In that case the abutment surface 3 is approximately normal to the taper surface 4a.

In a modified form of the embodiment shown in FIGS. 1 to 4, the rollers 10 and 11 of both pairs of rollers may also be of the same diameter. It will be appreciated however that this arrangement does not make optimum use of space. Arranging the co-operating bearing surface 6a perpendicularly with respect to the plane of symmetry S has the advantage that a continuous pressure plate 8 with a flat bearing surface can be used for both rollers 11 of the second pair of rollers. Possibly however it would also be possible for the angle of inclination $\gamma$ formed between the co-operating bearing surfaces 6a and the plane of symmetry to be an acute angle.

Figure 5:
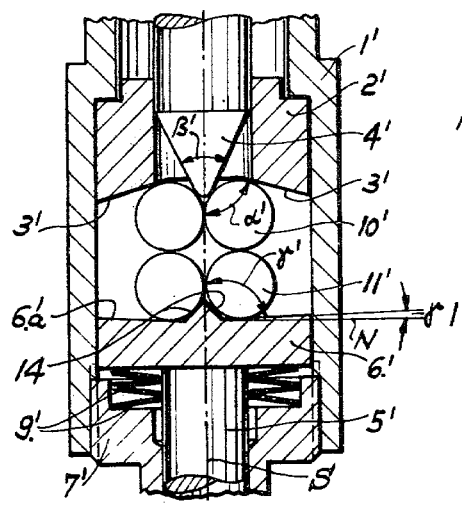
FIG. 5 shows a view in longitudinal section through a second embodiment.

This latter is the case in the embodiment shown in FIG. 5. In this embodiment, the co-operating bearing surfaces 6'a include an angle $\gamma'$ of 88° with the plane of symmetry S. The abutment surfaces 3' are inclined at an angle of 75° with respect to the plane of symmetry S. The rollers 10' and 11' of both pairs of rollers are of equal diameter. In this embodiment, it is important for no slip to occur, as far as possible, between the rollers 10' and 11'. For this reason the angle $\gamma$ 1 which is included by the co-operating surfaces 6'a and a line N normal to the plane of symmetry S should be less than the angle of friction $\rho$. From this it can then be calculated that, with oil lubrication, the angle $\gamma'$ must be larger than 87°.

When the primary member 4' is actuated, the rollers 10' of the first pair are urged outwardly and in so doing entrain the rollers 11' of the second pair, by virtue of frictional force, the rollers 11' also moving outwardly. If in this operation undesired slip should occur between the rollers 10' and 11' due to different frictional conditions, vibration or the like, one or both rollers 11' is moved outwardly by a smaller amount than the rollers 10'. When, upon removal of the load on the amplifier, the primary member 4' returns to its initial position, all rollers 10' and 11' move back again towards the plane of symmetry S. When this happens, the roller 11' which was moved outwardly by a smaller distance, as a result of slip when the amplifier was actuated, will come to lie prematurely against one of the centering surfaces 14 which are disposed in mirror-image relation with respect to the plane of symmetry S, and is thereby automatically re-centered in its initial position. The remaining components of the embodiment shown in FIG. 5 correspond in respect to their function to the components of the embodiment first described above, and are therefore denoted by the same reference numerals, with the addition of a prime. The description of the first embodiment in this respect therefore also applies to the second embodiment in a similar manner.

What I claim is:

1. In a mechanical amplifier comprising a wedge-shaped primary member which is displaceable along a plane of symmetry between a first pair of two rollers which are arranged in mirror-image relation with respect to said plane of symmetry and a secondary member which is displaceable in the same direction, the improvement comprising wherein each of the rollers of said first pair of rollers is freely movable and bears both against a stationary first bearing surface and on a parallel freely moveable roller of a second pair of rollers which is arranged between said first pair of rollers and said secondary member, wherein said rollers of said second pair bear against co-operating second bearing surfaces of the secondary member, wherein at least one of the bearing surfaces for the rollers on one side of said plane of symmetry makes with the plane of symmetry an angle of inclination which is smaller than 90°, wherein centering surfaces for said second rollers are arranged in mirror-image relation with respect to said plane of symmetry and between the rollers of said second pair for centering said second pair of rollers in an initial position of said amplifier, and wherein the rollers which are in contact with each other and their said bearing surfaces are held in continuous engagement by a spring assembly which acts on said secondary member and the roller diameters, the angles of inclination of the bearing surfaces and the taper angle of said primary member are so selected that, in all operating positions of said amplifier, the axes of two rollers which are in contact with each other always lie on the side of the connecting line between the contact lines of said rollers with their respective said bearing surfaces which is toward said plane of symmetry.

2. The amplifier of claim 1, wherein the taper surfaces of said primary member extend as far as said second pair of rollers and also form said centering surfaces for the rollers of said second pair.

3. The amplifier of claim 2, wherein the rollers of said first pair of rollers are of smaller diameter than the rollers of said second pair of rollers.

4. The amplifier of claim 3, wherein the roller diameters, the angles of inclination of said bearing surfaces with respect to said plane of symmetry and said taper angle of said primary member are so selected that the angle between each bearing surface and the common tangential plane through the contact line of the rollers is larger than the angle of friction between the rollers and bearing surfaces.

5. The amplifier of claim 4, including a housing enclosing all movable members of said amplifier which are in contact with each other, said movable members being lubricated with oil, and wherein the angles between said bearing surfaces and said common tangential plane of the rollers which are in contact with each other are larger than 3°.

6. The amplifier of claim 1, wherein the roller diameters are so selected in dependence on said taper angle of said primary member that, in the initial position of said amplifier, the outermost generating lines of two said rollers which are in contact with each other are disposed approximately on a common tangential plane which extends parallel to said plane of symmetry.

7. The amplifier of claim 2, wherein said first bearing surface is nearer the thicker part of the wedge-shaped member and extends at an acute angle to said plane of symmetry while the second bearing surface extends normal to said plane of symmetry.

8. The amplifier of claim 7, wherein the sum of said acute angle and half of said taper angle is approximately 90°.

9. The amplifier of claim 8, wherein the taper angle is about 38° to 40° and the diameter of the rollers of said second pair of rollers is approximately 1.4 times the diameter of the rollers of said first pair of rollers.

10. The amplifier of claim 1, wherein the rollers of both said first and second pairs of rollers are of the same diameter.

11. The amplifier of claim 10, wherein said first bearing surfaces and said second bearing surfaces are inclined in opposite directions with respect to said plane of symmetry.

12. The amplifier of claim 11, wherein the angle which is included between said second bearing surfaces and a line normal to said plane of symmetry is smaller than the angle of friction.

13. The amplifier of claim 12, including a housing enclosing the movable components of the amplifier, said components being oil-lubricated, and the angle included between said second bearing surfaces and said plane of symmetry being larger than 87°.

* * * * *